(12) United States Patent
Kirsch et al.

(10) Patent No.: US 7,849,276 B2
(45) Date of Patent: *Dec. 7, 2010

(54) HOST MEMORY INTERFACE FOR A PARALLEL PROCESSOR

(75) Inventors: Graham Kirsch, Hampshire (GB); Jonathan Mangnall, Birmingham (GB)

(73) Assignee: Micron Technology, Inc., Boise, ID (US)

( * ) Notice: Subject to any disclaimer, the term of this patent is extended or adjusted under 35 U.S.C. 154(b) by 147 days.

This patent is subject to a terminal disclaimer.

(21) Appl. No.: 12/205,673

(22) Filed: Sep. 5, 2008

(65) Prior Publication Data

US 2009/0049269 A1 Feb. 19, 2009

Related U.S. Application Data

(63) Continuation of application No. 11/716,514, filed on Mar. 9, 2007, now Pat. No. 7,424,581, which is a continuation of application No. 10/395,695, filed on Mar. 20, 2003, now Pat. No. 7,206,909.

(30) Foreign Application Priority Data

Sep. 17, 2002 (GB) .................................. 0221562.2
Dec. 5, 2002 (GB) ............................... 02228438.8

(51) Int. Cl.
*G06F 12/00* (2006.01)
(52) U.S. Cl. ........................ 711/155; 711/202; 712/28
(58) Field of Classification Search ................ 711/155, 711/202; 712/28

See application file for complete search history.

(56) References Cited

U.S. PATENT DOCUMENTS

| 5,446,844 | A | 8/1995 | Steckler et al. ............. 395/250 |
| 5,953,738 | A | 9/1999 | Rao ............................ 711/105 |
| 5,956,274 | A | 9/1999 | Elliott et al. ........... 365/189.04 |
| 6,233,646 | B1 | 5/2001 | Hahm ........................... 711/2 |
| 6,381,671 | B1 | 4/2002 | Ayukawa et al. ............ 711/104 |
| 6,505,269 | B1 | 1/2003 | Potter ....................... 711/20.2 |
| 6,519,598 | B1 | 2/2003 | Nishizawa et al. ........... 707/10 |
| 2002/0027824 | A1 | 3/2002 | Cowles et al. .......... 365/230.03 |

FOREIGN PATENT DOCUMENTS

| EP | 0 584 783 A3 | 8/1993 |
| WO | 01/01242 A1 | 6/2000 |

OTHER PUBLICATIONS

Vuillemin, J. et al., "Programmable Active Memories: Reconfigurable Systems Come of Age", IEEE Transactions on VLSI Systems, vol. 4, No. 1, 1996, pp. 56-69, available from the Internet at http://citeseer.nj.nec.com/vuillemin96programmable.html.

*Primary Examiner*—Jared I Rutz
(74) *Attorney, Agent, or Firm*—Dorsey & Whitney LLP

(57) ABSTRACT

A memory interface for a parallel processor which has an array of processing elements and can receive a memory address and supply the memory address to a memory connected to the processing elements. The processing elements transfer data to and from the memory at the memory address. The memory interface can connect to a host configured to access data in a conventional SDRAM memory device so that the host can access data in the memory.

36 Claims, 15 Drawing Sheets

HOST MEMORY INTERFACE FOR A PARALLEL PROCESSOR

CROSS-REFERENCE TO RELATED APPLICATIONS

This application is a continuation of U.S. patent application Ser. No. 11/716,514, filed Mar. 9, 2007, U.S. Pat. No. 7,424,581, which is a continuation of U.S. patent application Ser. No. 10/395,695, filed Mar. 20, 2003, U.S. Pat. No. 7,206,909.

FIELD OF THE INVENTION

The present invention relates to accessing data in a parallel processor including a memory array. Preferred embodiments of the present invention relate to accessing of data stored in memory connected to an array of processing elements in an active memory device by a host configured for connection with a conventional memory device.

BACKGROUND TO THE INVENTION

A simple computer generally includes a central processing unit CPU and a main memory. The CPU implements a sequence of operations encoded in a stored program. The program and data on which the CPU acts is typically stored in the main memory. The processing of the program and the allocation of main memory and other resources are controlled by an operating system. In operating systems where multiple applications may share and partition resources, the computer's processing performance can be improved through use of active memory.

Active memory is memory that processes data as well as storing it. It can be instructed to operate on its contents without transferring its contents to the CPU or to any other part of the system. This is typically achieved by distributing parallel processors throughout the memory. Each parallel processor is connected to the memory and operates on the memory independently of the other processing elements. Most of the data processing is performed within the active memory and the work of the CPU is thus reduced to the operating system tasks of scheduling processes and allocating system resources.

A block of active memory typically consists of the following: a block of memory, e.g. dynamic random access memory DRAM, an interconnection block and a memory processor processing element array. The interconnection block provides a path that allows data to flow between the block of memory and the processing element array. The processing element array typically includes multiple identical processing elements controlled by a sequencer. Processing elements are generally small in area, have a low degree of hardware complexity, and are quick to implement, which leads to increased optimisation. Processing elements are usually designed to balance performance and cost. A simple more general-purpose processing element will result in a higher level of performance than a more complex processing element because it can be easily coupled to many identical processing elements. Further, because of its simplicity, the processing element will clock at a faster rate.

In any computer system, it is important that data can be made available to the processor as quickly as possible. In an active memory device, the complexity of the device means that data has to be accessed from the memory via the processing elements. Thus, the speed of access to the memory by a host processor is reduced. In addition, the added complexity that an active memory device bestows on a computer system means that additional complexity is added to the method of accessing data from the active memory device, which itself imparts additional complexity on the host processor.

In current systems, due to this additional complexity, a host connected to an active memory device has to be custom designed specifically for the active memory device. Thus, hosts configured for connection with one type of active memory device cannot be used with a different type of active memory device. Furthermore, hosts which have been designed for connection with conventional memory devices, such as standard SDRAM memories, cannot be connected to active memory devices at all. As such, considerable expense is incurred in the development of computer systems using active memory devices, since not only does the active memory device have to be designed and built, but also a complete host system to operate with it. Conventional memory devices are defined as any type of non-active memory devices which can be addressed by conventional memory command signals conforming to common industry standards.

Accordingly, it is an object of the present invention to provide a standard memory interface for an active memory device which permits different types of host processors to access the memory in the device.

It is a further object of the present invention to provide a memory interface for an active memory device for use with conventional host processors which are configured to connect to standard "non-active" memory devices, such as a standard SDRAM memory module.

SUMMARY OF THE INVENTION

In view of the foregoing and in accordance with one aspect of the present invention, there is provided a memory interface for a parallel processor having an array of processing elements, the memory interface being adapted to operate as follows:
  to receive memory control signals and memory addresses from a host;
  to apply at least a portion of the memory addresses to a memory connected to the processing elements; and
  to apply control signals to the processing elements, such that in response the processing elements transfer data:
    to and from the memory at the memory address; or
    to and from the host; or
    both; and
  wherein the memory interface is adapted to connect to a host configured to access data in a conventional memory device, such that the host can access data in the memory.

The memory control signals and memory addresses may include a row address signal RAS, a row address, a column address signal CAS, a column address and a write enable signal WE.

The present invention further provides a memory interface for a parallel processor having an array of processing elements, the memory interface being adapted to operate as follows:
  to receive memory control signals and memory addresses from a host;
  to apply at least a portion of the memory addresses to a memory connected to the processing elements; and
  to apply control signals to the processing elements, such that in response the processing elements transfer data:
    to and from the memory at the memory address; or
    to and from the host; or
    both; and wherein the memory control signals and memory addresses include a row address signal RAS, a row address, a column address signal CAS, a column address and a write enable signal WE.

Preferably, on receipt of a row address and a first configuration of memory control signals including a RAS assertion, the interface activates a page of data by transferring data from the row in the memory corresponding to the row address, into the processing elements.

Preferably, on receipt of a second configuration of memory command signals, the interface deactivates the page of data by transferring data from the processing elements into the row in the memory corresponding to the row address.

Preferably, on receipt of a column address and a third configuration of memory command signals including a CAS assertion and a WE assertion, the interface transfers data from the activated page of data in the processing elements to the host, beginning with data from the column in the memory corresponding to the column address.

Preferably, on receipt of a column address and a fourth configuration of memory command signals including a CAS assertion and a WE assertion, the interface transfers data from the host to the activated page of data in the processing elements, beginning with data for the column in the memory corresponding to the column address.

The present invention further provides an active memory comprising a memory, an array of processing elements connected to the memory and a memory interface and methods of reading and writing to such a memory.

BRIEF DESCRIPTION OF THE DRAWINGS

A specific embodiment will now be described by way of example only and with reference to the accompanying drawings, in which.

DETAILED DESCRIPTION

Figure 1:
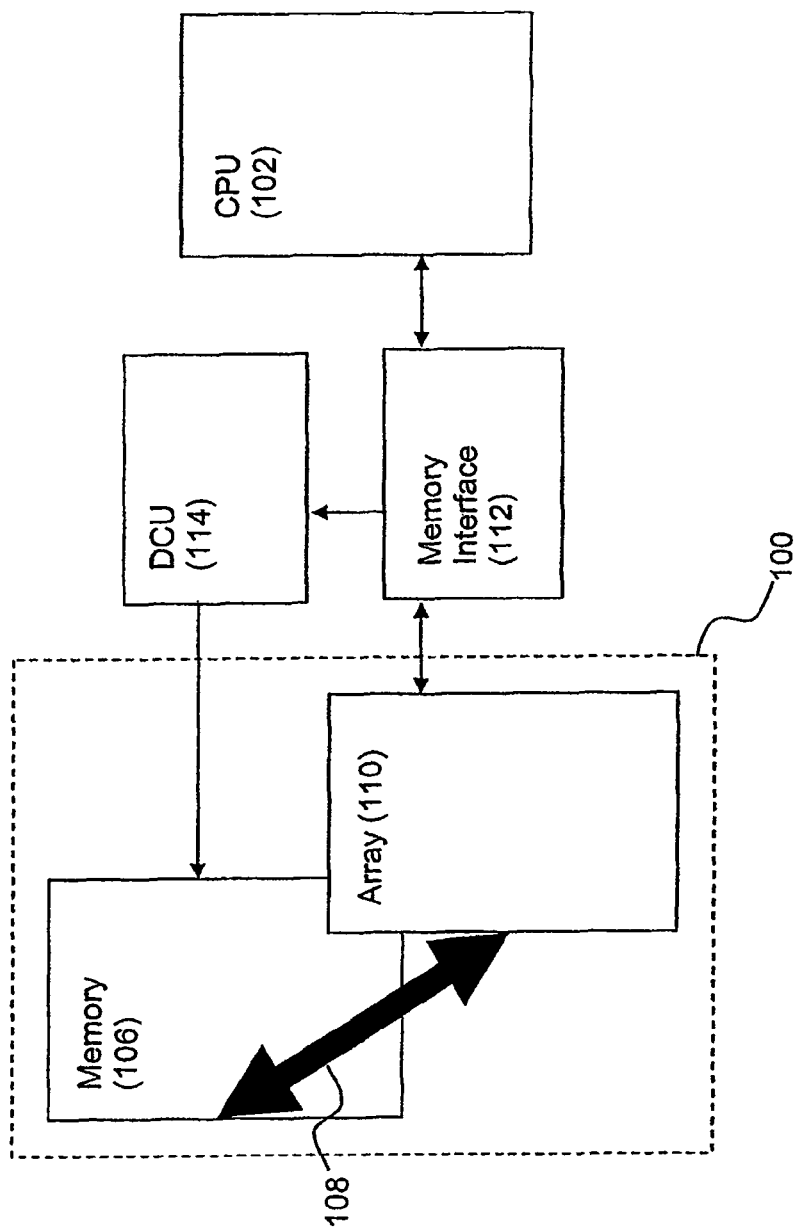
FIG. 1 shows one embodiment of an active memory block in accordance with the present invention.

Referring to FIG. 1, one embodiment of an active memory block in accordance with the invention is shown. Active memory block 100 includes a memory 106 and an PE array 110 of processing elements (PEs). Memory 106 is preferably random access memory (RAM), in particular DRAM. The PE array 110 communicates with memory 106 via an interconnection block 108. The interconnection block 108 can be any suitable communications path, such as a bi-directional high bandwidth path. A host 102, which in this case is a central processing unit CPU, communicates with the PE array 110 via memory interface 112. The memory interface 112 further communicates with the memory 106 via a DRAM control unit DCU 114. The memory interface includes conventional address, data and control lines.

Figure 2:
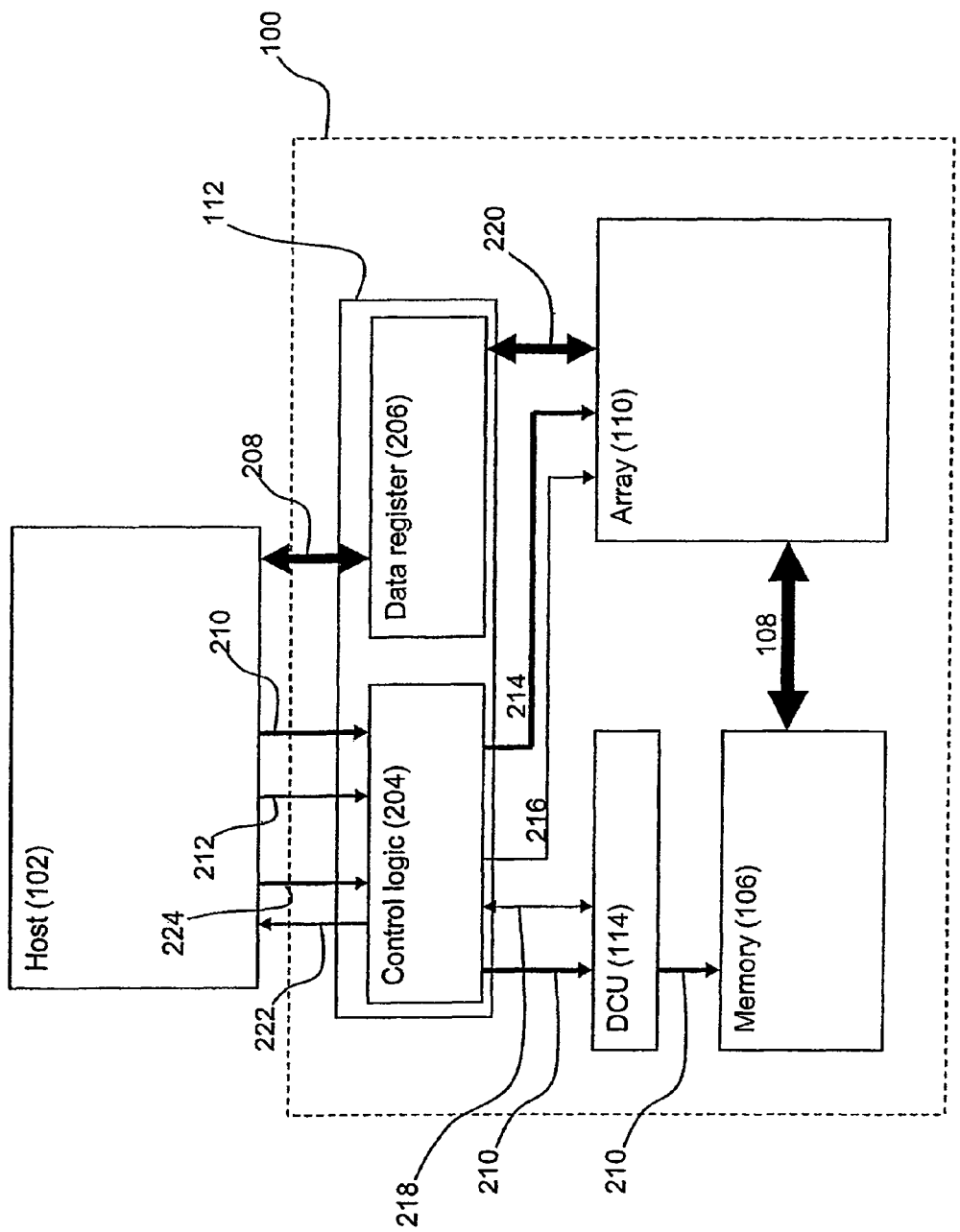
FIG. 2 shows one embodiment of the components of the active memory block in accordance with the present invention.

Referring to FIG. 2, the active memory block 100 is shown connected to the host 102 The active memory block 100 comprises the memory 106, an array 110 of processing elements and the memory interface 112 having control logic 204 and a data register 206. The data register 206 is connected to the host 102 by a first data path 208 which is adapted to transfer high bandwidth data between the host 102 and the data register 206. The host 102 supplies a memory address 210 in the conventional way, using row (MSBs) and column (LSBs) addresses and RAS and CAS assertions, and other conventional memory access command signals 212 to the control logic 204. A READY signal 222 is generated by the control logic 204 and sent back to the host 102 to indicate that further command signals 212 can be sent.

The control logic 204 interprets the conventional memory access command signals 212 and the memory address 210 and generates an array address 214 from the column address of the memory address 210 and array control signals 216 which are sent to the PE array 110 and memory control signals 218 which are sent to the memory 106 via the DCU 114. The processing elements in the PE array 110 are configured to receive or send a row of data from or to the row in the memory 106 corresponding to the row address (MSBs) of the memory address 210. The PE array 110 is configured to respond to the array control signals 216 and the array address 214 to transfer data from the processing elements addressed by the array address 214. The data is transferred between the memory 106 and the PE array 110 via the interconnection block 108 and between the host 102 and the PE array 110 via the first and second data paths 208, 220 which are linked across the data register 206.

The control logic 204 also receives a page command signal 224 from the host 102 to determine which of two pages of data in the PE array 110 to address. The selection of the page is made via the array control signals 216.

Figure 3:
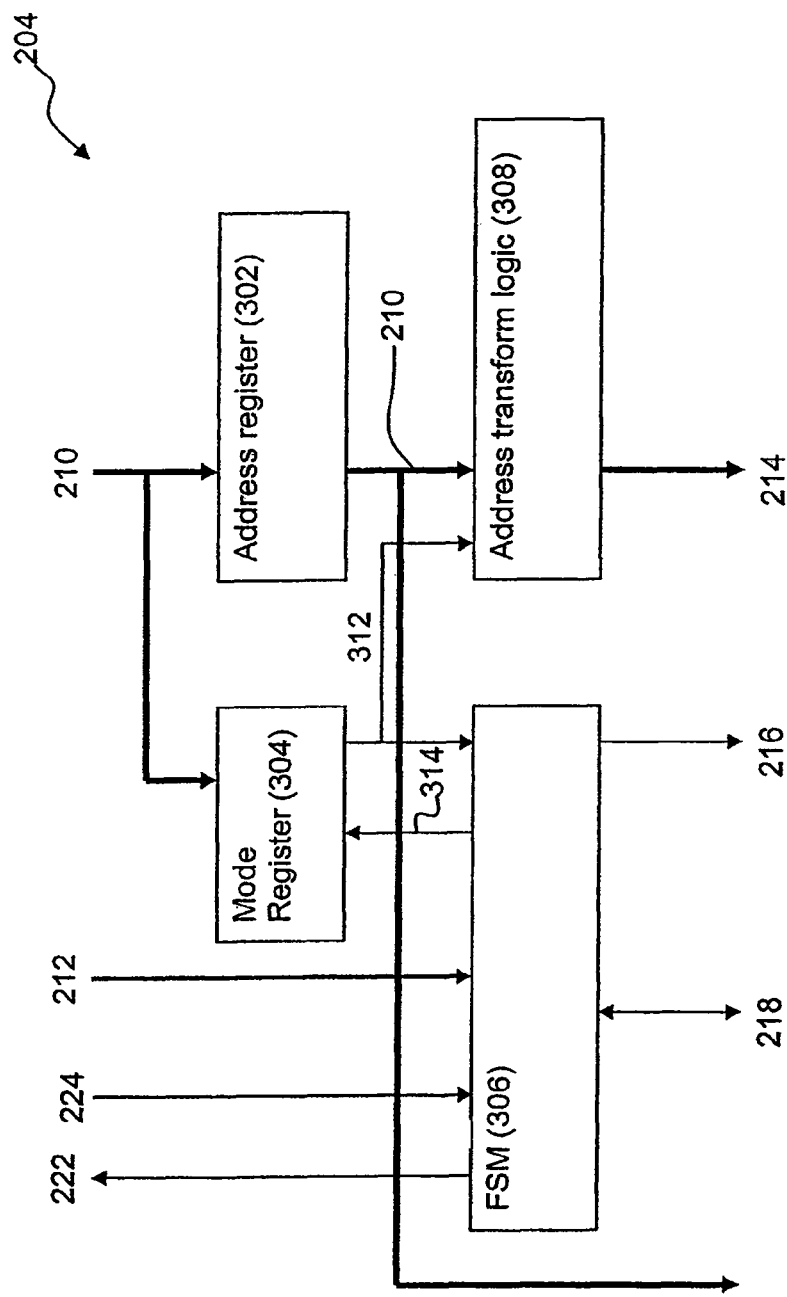
FIG. 3 shows one embodiment of control logic in the memory interface.

Referring to FIG. 3, the control logic 204 is shown including an address register 302 for receiving the memory address 210 from the host 102, a mode register 304 for generating mode signals 312. A finite state machine FSM 306 receives the command signals 212 from the host 102 and the mode signals 312 from the mode register 304 and generates the memory control signals 218 and array control signals 216. Address transform logic 308 generates an array address 214 from the column address (LSBs) of the memory address 210 and sends it to the PE array 110, to address the appropriate processing elements in the PE array 110 corresponding to the array address 214 and the mapping of the addresses to the processing elements, as specified by the mode signals 312.

Figure 4:
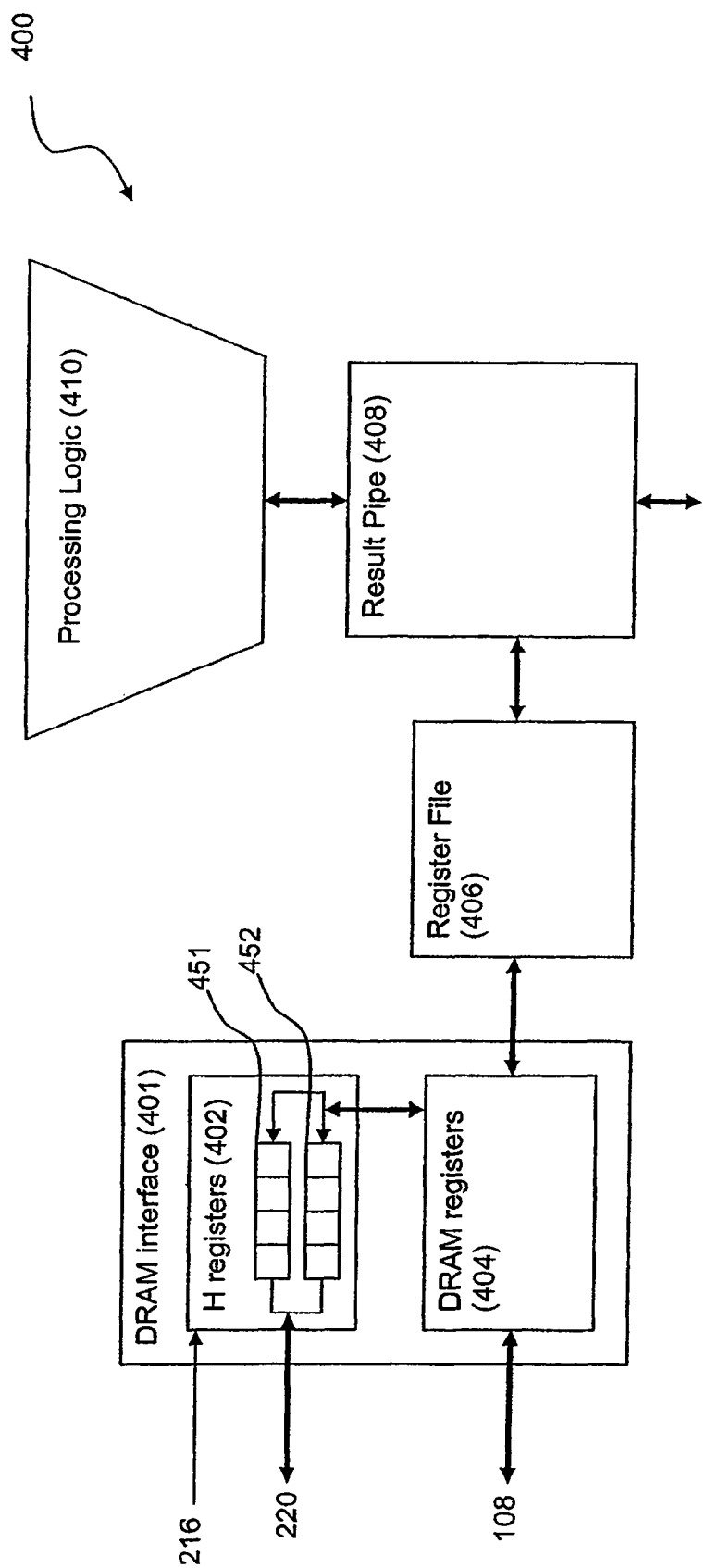
FIG. 4 shows one embodiment of a processing element in the active memory block in accordance with the present invention.

The contents of a mode register 304 is used to determine the data ordering in the PE array 110 and the memory 106 and sends mode signals 312 to the address transform logic 308 and the DCU 114 so that the address transform logic 308 can interpret and address the data in the PE array 110 correctly and the DCU 114 can address the data in the memory 106. Referring to FIG. 4, a processing element 400 in the PE array 110 is shown comprising a DRAM interface 401 for connecting the memory 106 and the memory interface 112 with the processing element 400. Also included in the processing element 400 is a register file 406 between the result pipe 408 and processing logic 410. Data from the memory 106 is sent via the DRAM interface 401 to be processed in the processing logic 410 and moved between other processing elements in the PE array 110 via the result pipe 408. The DRAM interface 401 comprises host registers (H-registers) 402 and DRAM registers 404. The H-registers 402 receive from and send data to the memory interface 112 via the second data path 220.

The H-registers 402 are arranged in a first bank 451 and a second bank 452, each bank corresponding respectively to a first and second page of data to be stored in the H-registers 402 of all of the processing elements. The page to be addressed is determined by the page command signal 224 which is interpreted by the FSM 306 and sent to the PE array 110 with the array control signals 216. Thus, at any given time, two pages of data can be active in the PE array 110.

Every command issued to the interface, by a host processor or external I/O device is accompanied by a page select. The interface maintains a complete set of operational parameters for each page (for example the DRAM address used by the ACTIVE command). A page consists of four planes of DRAM bytes in the H-registers in each PE, or 1024 bytes. The data in the first plane is taken from the DRAM data at the page or row address supplied with the ACTIVE command described below. Once a page is held in the H-registers 402, burst reads and writes can take place as described below. The interface data input and output ports are 32 bits wide, and so the unit of data transfer during bursts is the 32 bit word. Each page contains 256 32 bit words, which are addressed with eight address bits. The mapping mode, described below, determines the way that each eight bit address maps to the bytes within the H registers.

The DRAM registers 404 receive data from and send data to the memory 102 at the row corresponding to the row address (MSBs) of the memory address 120 via the interconnection block 108. The data is received from the DRAM registers 404 and transferred between the memory interface 112 via one of the banks of H-registers 402, the bank being specified by the array command signals 212. Each H-register can store one byte (8 bits) of data. Thus, a given processing element 400 can store a 32 bit word for each of the two pages.

Figure 5A:
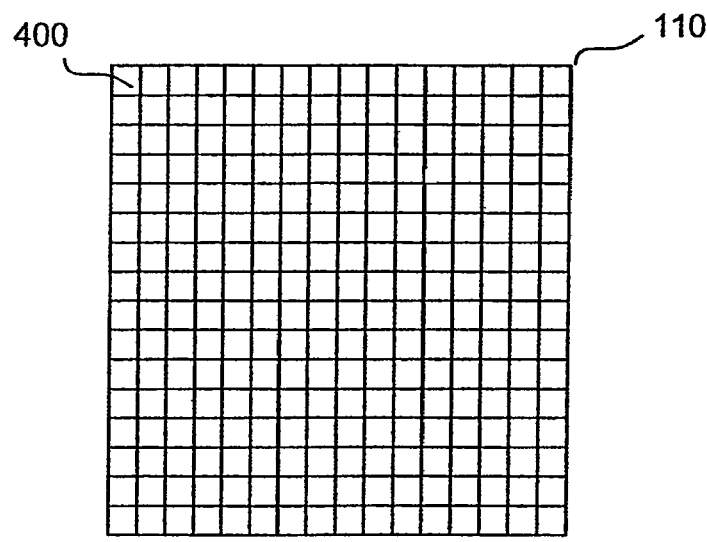
FIGS. 5a and 5b show representations of the array of processing elements in accordance with the present invention.
Figure 5B:
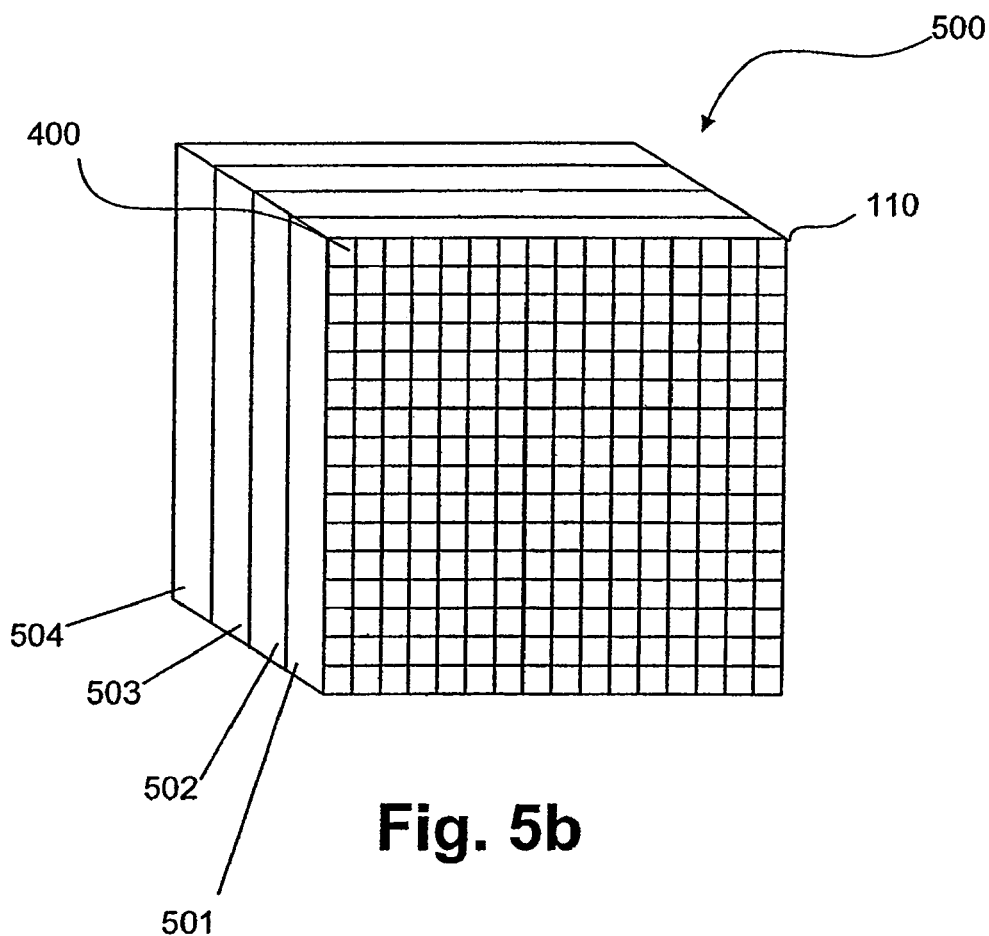

Referring to FIGS. 5a, 5b and 6a to 6c, a representation of the PE array 110 is shown having individual processing elements 400. In FIG. 5b, the first page 500 of data is shown with the H-registers 402 in the first bank 451 represented by four layers 501, 502, 503, 504 of H-registers 402. The second page of data is not shown, but in a similar way to the first page 500 uses four H-registers 402 in the second bank 452 and operates in a similar manner to the first page 500 as discussed below.

For the first page 500, each layer 501, 502, 503, 504 of H-registers corresponds to first, second, third or fourth H-registers in each processing element 400. For the PE array 110 shown in FIG. 5b, which has 16 rows and 16 columns, there are 256 processing elements and 1024 bytes of data in the first page 500.

Figure 6A:
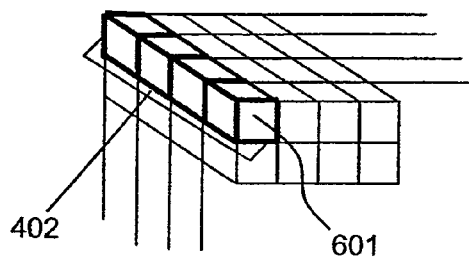
FIGS. 6a to 6c show different array address mappings in accordance with the present invention.
Figure 6B:
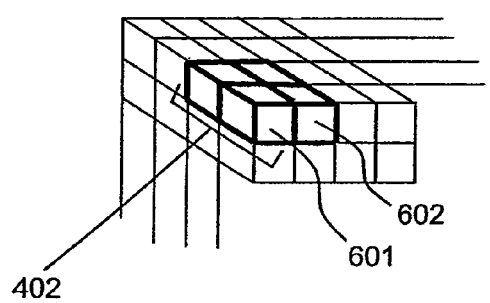
Figure 6C:
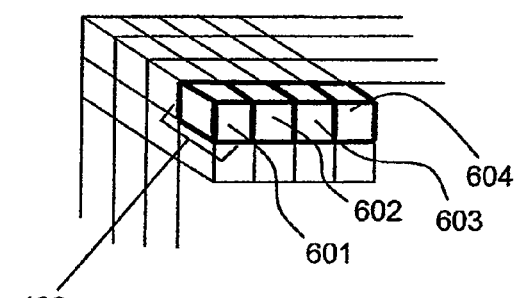

FIGS. 6a to 6c show different mappings of data in the PE array 110, the type of mapping being set or interpreted by the mode signals 312. The second data path 220 is 32 bits wide, so the corresponding unit of data transfer from the H-registers 402 to the data register 206 is a 32 bit word. There are 256 processing elements in the PE array 110 and therefore 256 32 bit words which are addressed by an array address 214 which is 8 bits wide.

In FIG. 6a, 32 bits of data are contained in each processing element 601, with 8 bits of data held in each of the four H-registers 402 in each processing element. This is referred to as 'word' mapping and is used for 32 bit processing element operations. Each array address corresponds to an entire processing element.

In FIG. 6b, 2×16 bits of data are contained in each processing element 601, 602, with 32 bits of data in total held across two H-registers 402 in each of two processing elements 601, 602. This is referred to as 'half-word' mapping and is used for 16 bit processing element operations. Thus, for each processing element, there are two mapped array addresses, with each array address corresponding to two different H-registers.

In FIG. 6c, 4×8 bits of data are contained in each processing element 601, 602, 603, 604, with 32 bits of data held across a single H-register 402 in each of four processing elements 601, 602, 603, 604. This is referred to as 'byte' mapping and is used for 8 bit processing element operations. Thus, for each processing element, there are four mapped array addresses, with each array address corresponding to a different H-register.

In addition to the aforementioned mappings of data in the PE array 110, the endianism of the data can be set by the host 102, i.e. the ordering of the bytes in each 32 bit word stored in the H-registers 402. There are two different orderings of bytes: big endian and little endian. Routines in the processing elements expect multi-byte words to be stored in the register file in a particular way and by convention big endian is the normal mode which means that the most significant byte of a multi-byte number is held in the lowest addressed register.

Figure 6D:
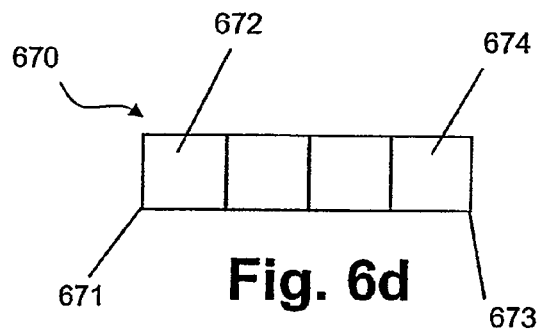
FIGS. 6d to 6e show different mappings of bytes within a 32-bit word stored in host registers in the processing elements in accordance with the present invention.
Figure 6E:
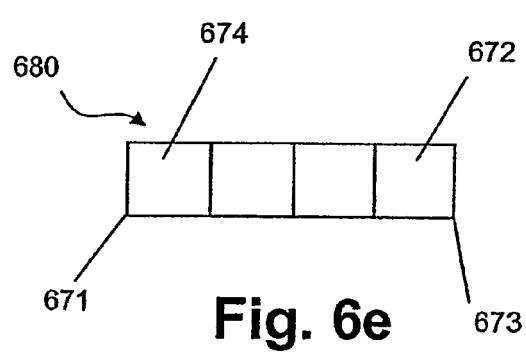

Big endian mode 670 is shown in FIG. 6d, which shows a lowest addressed register 671 containing a most significant byte 672 of a 32-bit word and a highest addressed register 673 containing a least significant byte 674. Little endian mode 680 is shown in FIG. 6e, which shows the lowest addressed register 671 containing the least significant byte 672 of a 32-bit word and the highest addressed register 673 containing the most significant byte 674.

The mapping and endian modes are specified by the host issuing a LOAD command (see below) and placing mode register fields (see Table 1 below) onto the memory address lines. The mode register fields are stored in the mode register 304 which sends the mode signals 312 to the address transform logic 308 so that the address transform logic can interpret the data in the PE array 110 appropriately.

TABLE 1

Mode register fields

| Bits | Field | Comments |
| --- | --- | --- |
| 0 to 1 | Mapping | 0: word mapping<br>1: half-word mapping<br>2, 3: byte mapping |
| 2 | Endianism | 0: big-endian byte mapping<br>1: little-endian byte mapping |

Figure 7:
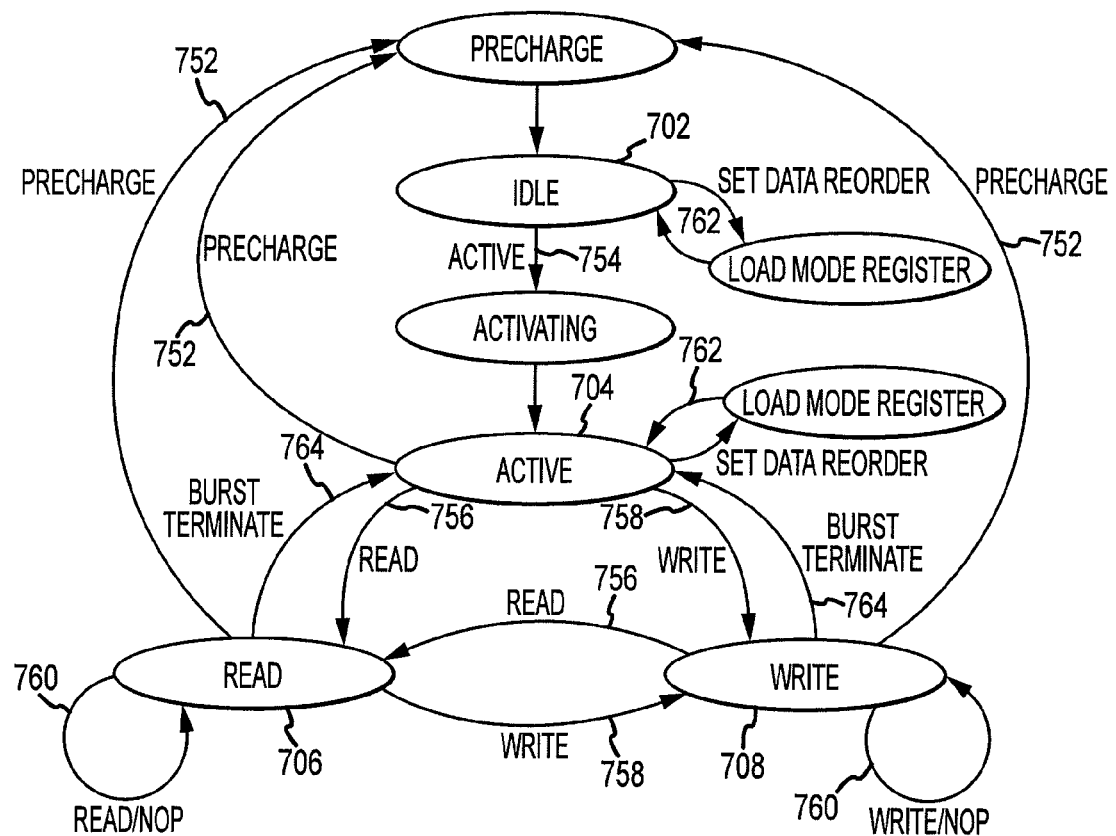
FIG. 7 shows a state diagram for a finite state machine in the control logic in accordance with the present invention.

Referring to FIG. 7, a state diagram for the finite state machine FSM 306 is shown. As mentioned above, the FSM 306 receives conventional memory access command signals 212 from the host 101. The conventional memory access commands, which are interpreted by and implemented in the FSM 306 and shown in FIG. 7, are listed in Table 2 below.

TABLE 2

Command Functions and Encoding

| Command value | RAS | CAS | WE | State |
| --- | --- | --- | --- | --- |
| 7 | 1 | 1 | 1 | NOP 760 |
| 6 | 1 | 1 | 0 | Burst Terminate 764 |

TABLE 2-continued

Command Functions and Encoding

| Command value | RAS | CAS | WE | State |
|---|---|---|---|---|
| 5 | 1 | 0 | 1 | Read 756 |
| 4 | 1 | 0 | 0 | Write 758 |
| 3 | 0 | 1 | 1 | Active 754 |
| 2 | 0 | 1 | 1 | Deactivate 752 |

In Table 2, the command signals 212 sent by the host 101 are the conventional memory access signals: RAS (Row Address Signal); CAS (Column Access Signal); and WE (Write Enable), which are interpreted by the FSM 306 as the states listed in Table 2 and shown in FIG. 7.

As can be seen from FIG. 7, the FSM 306 will remain in an idle state 702 and an active state 704 indefinitely until a command is issued by the host 101.

From the idle state 702, before data can be accessed, a page must be activated using the ACTIVE command 754 (see Table 1) to enter the active state 704 in which a page of 256 32-bit values has been activated in the H-registers 402 for reading and writing by the host 102. Activation consists of loading data from the memory 106 into the H-registers 402 of the processing elements according to the mapping scheme currently in force. The ACTIVE command 754 can take a variable amount of time, so a READY signal 222 signals to the host 102 that the ACTIVE command 754 has completed and the active state 704 has been entered. After an ACTIVE command 754 has been issued by the host 102, the command inputs will be ignored until after the READY signal 222 goes high indicating completion of the ACTIVE command 754. Once a page has been activated it remains active until a DEACTIVATE or PRECHARGE command is registered for that page.

Figure 8:
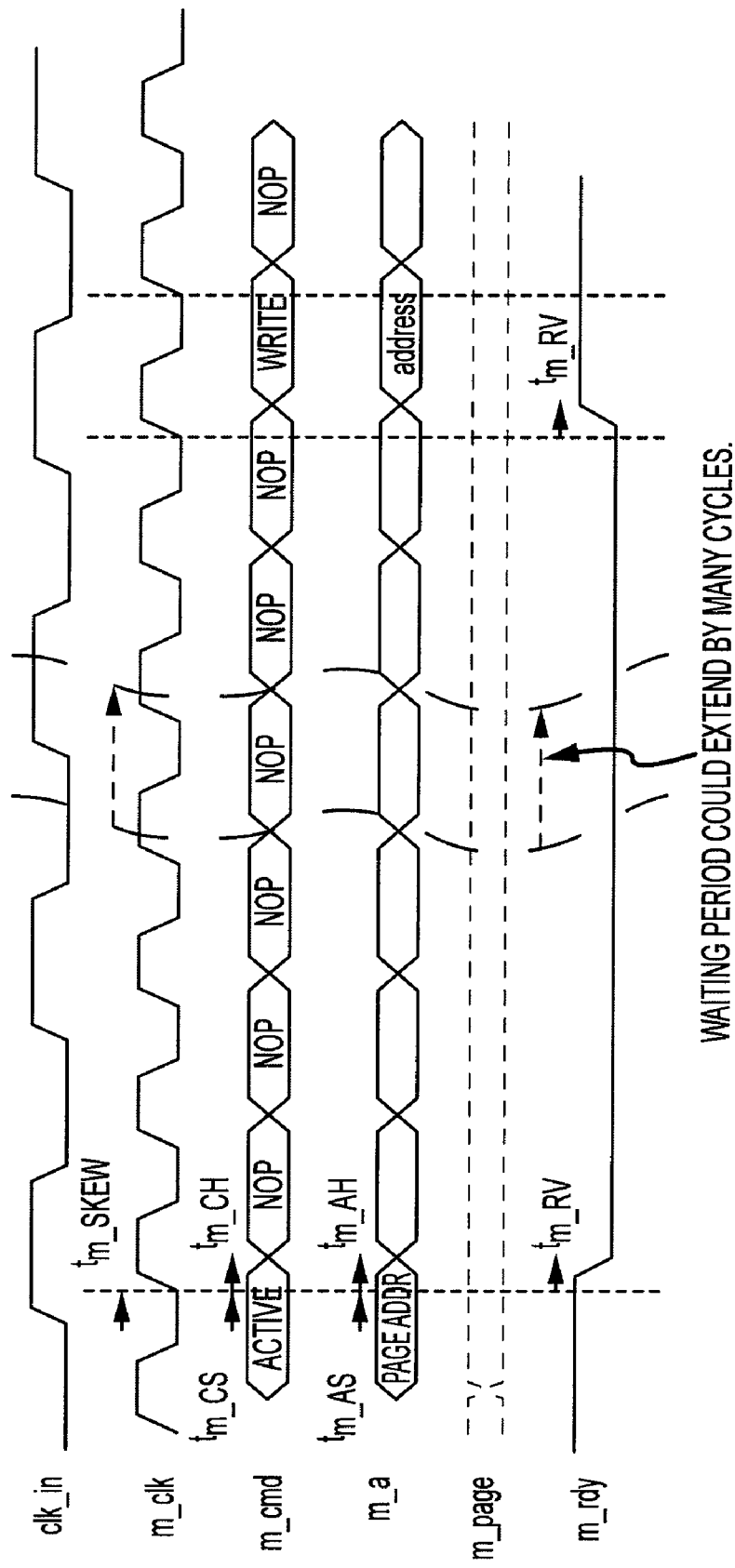
FIGS. 8-15 are timing diagrams showing the operation of various memory commands.

FIG. 8 is a timing diagram illustrating the operation of the ACTIVE command. In FIGS. 8-15, The various signals shown have the following significance.

TABLE 3

Signal Descriptions

| Signal | In/Out | Description |
|---|---|---|
| m_clk | Out | Memory Port Timing Reference Clock. m_clk runs at twice the frequency of the master clock clk_in. Memory port transactions are timed relative to the rising edge of m_clk. |
| m_d[32] | In/Out | Memory interface data. |
| m_a[12] | In | Memory interface address. |
| m_cmd[3] | In | Memory interface command. |
| m_page | In | Memory interface page select: selects which page of H registers is activated by the current command. |
| m_ce | In | Memory interface enable: transaction only takes place when m_ce is active. |
| m_oe | In | Memory interface output enable: when (1), chip drives m_d out. When (0) m_d is high impedance. |
| m_rdy | Out | Memory interface ready: indicates completion of ACTIVE or DEACTIVATE command. A command should only be issued when m_rdy is high. After an ACTIVE or DEACTIVATE command is registered, no other commands are registered until the first clock edge after m_rdy goes high signaling completion. |

In addition, the timing parameters used in FIGS. 8-15 have the following significance.

TABLE 4

Timing Parameters

| Timing | Description | Min (ns) | Max (ns) |
|---|---|---|---|
| $t_m\_CS$ | Command setup to clock | 2.0 | |
| $t_m\_CH$ | Command hold after clock | 0.0 | |
| $t_m\_AS$ | Address setup to clock | 2.0 | |
| $t_m\_AH$ | Address hold after clock | 0.0 | |
| $t_m\_DIS$ | Data in setup to clock | 2.0 | |
| $t_m\_DIH$ | Data in hold after clock | 0.0 | |
| $t_m\_DOV$ | Data output, clock to data valid | 3.0 | 6.0 |
| $t_m\_DHZ$ | Data output, m_oe to high Z | | 3.0 |
| $t_m\_DLZ$ | Data output, m_oe to low Z | 1.0 | 4.5 |
| $t_m\_RV$ | m_rdy, clock to valid | 3.0 | 6.0 |
| $t_m\_SKEW$ | m_clk skew vs. clk_in | 0 | |
| $t_m\_CLK$ | Clock period | 15 | |

From the active state 704, upon receipt of the READ command 756 (see Table 1), the FSM 306 enters a read state 706 in which data is transferred in a burst from the H-registers 402 along the second data path 220 to the data register 206 and from there to the host 102 along the first data path 120. Read accesses to the DRAM are burst-orientated, up to a maximum burst length of 256 32 bit words (a whole page). The first READ or WRITE command, described below, can be registered on the clock edge following the READY signal going high. The array address for beginning the read burst is taken from bits 7 to 0 (LSBs) of the memory address 210, corresponding to the column address received with the CAS assertion. If a read burst runs off the end of the page, then it wraps around back to the start of the page and continues automatically. Bursts may be any length, but if a burst continues for longer than a page of H-registers, namely 256 transfers, the data will be repeated.

Figure 10:
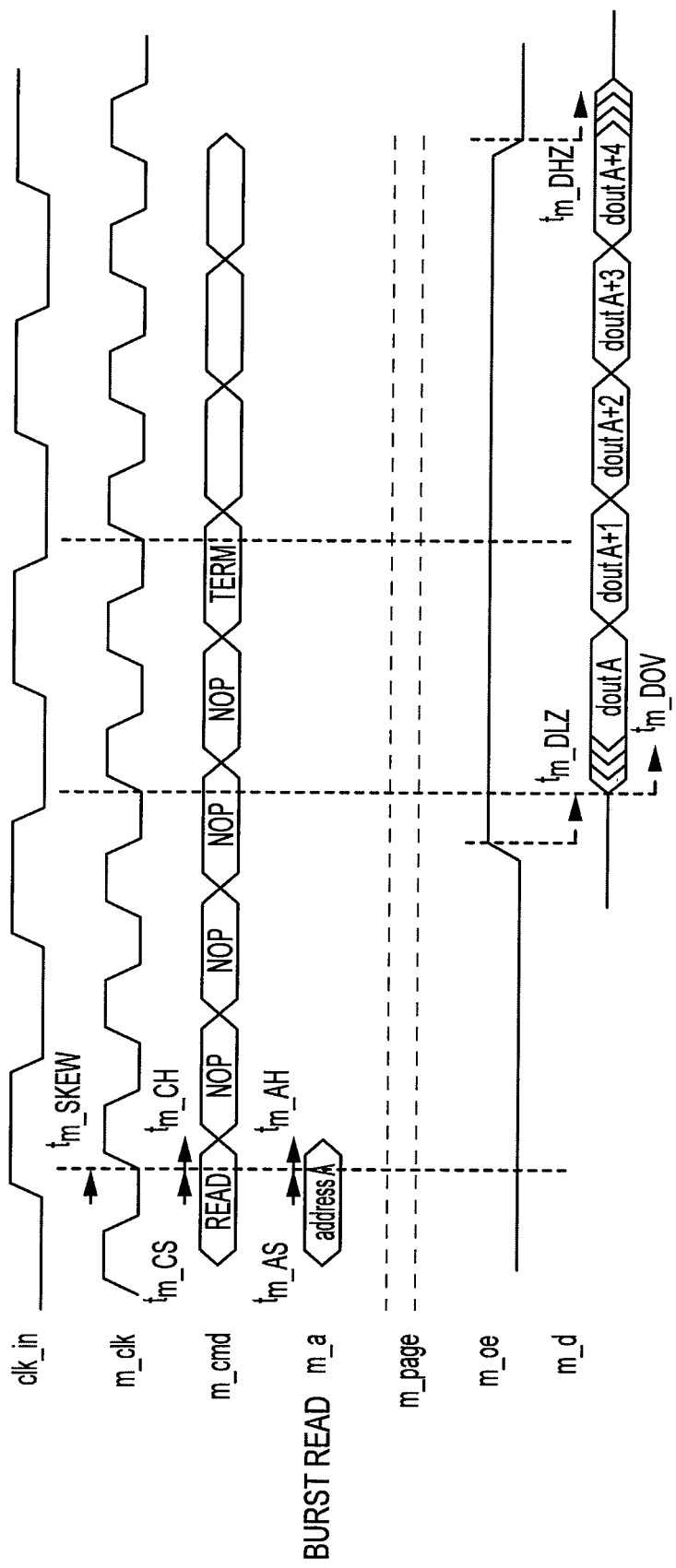
Figure 11:
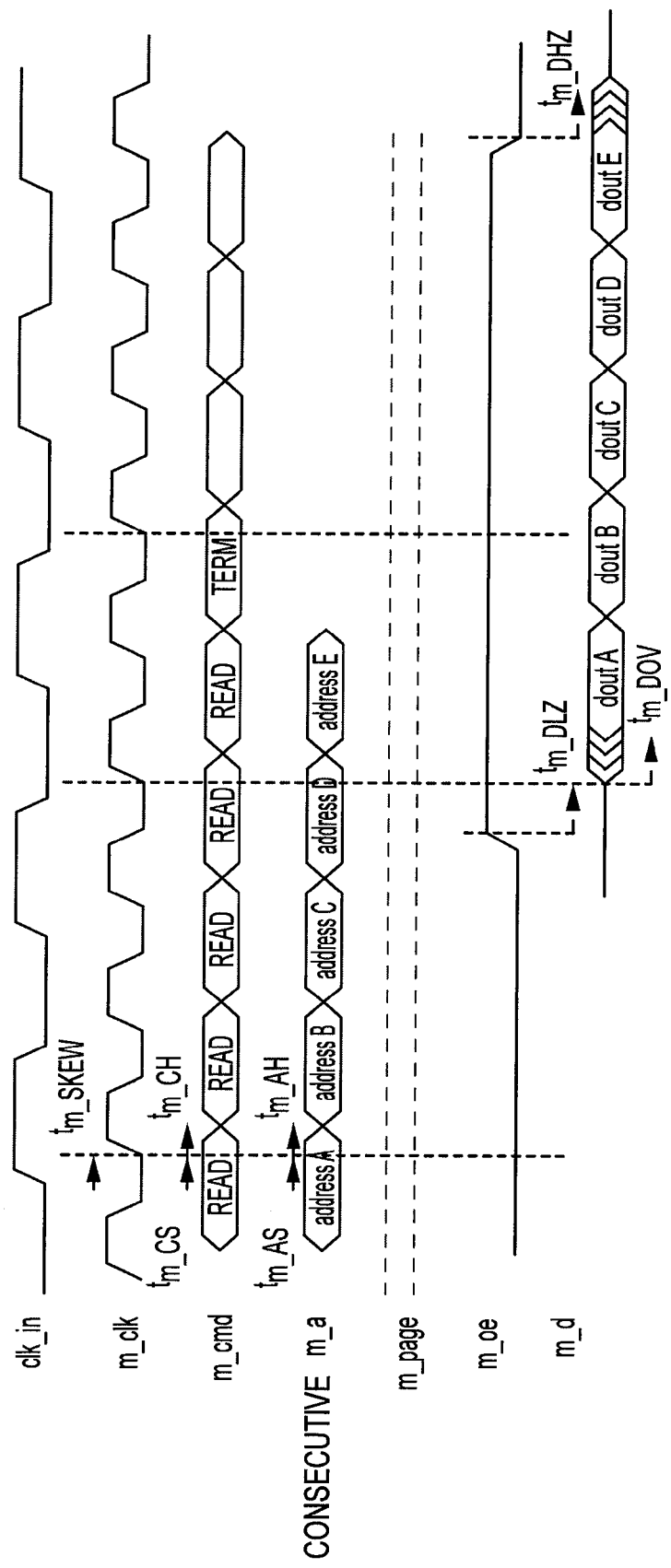

FIG. 10 is a timing diagram illustrating the operation of a single burst READ command and FIG. 11 is a timing diagram illustrating the operation of the consecutive READ commands, illustrating the termination of prior READ bursts by subsequent READ commands.

From the active state 704, upon receipt of the WRITE command 758 (see Table 1), the FSM 306 enters a write state 704 in which data is transferred in a burst from the host 102 to the data register 206 along the first data path 120 and from the data register 206 to the H-registers 402 along the second data path 220. Write accesses to the DRAM are burst-orientated, up to a maximum burst length of 256 32 bit words (a whole page). The array address 214 for beginning the write burst is taken from bits 7 to 0 (LSBs) of the memory address 210, corresponding to the column address received with the CAS assertion. If a write burst runs off the end of the page, then it wraps around back to the start of the page and continues automatically. Bursts may be any length, but if a burst continues for longer than a page of H-registers, namely 256 transfers, the written locations will be repeated and overwritten.

Figure 12:
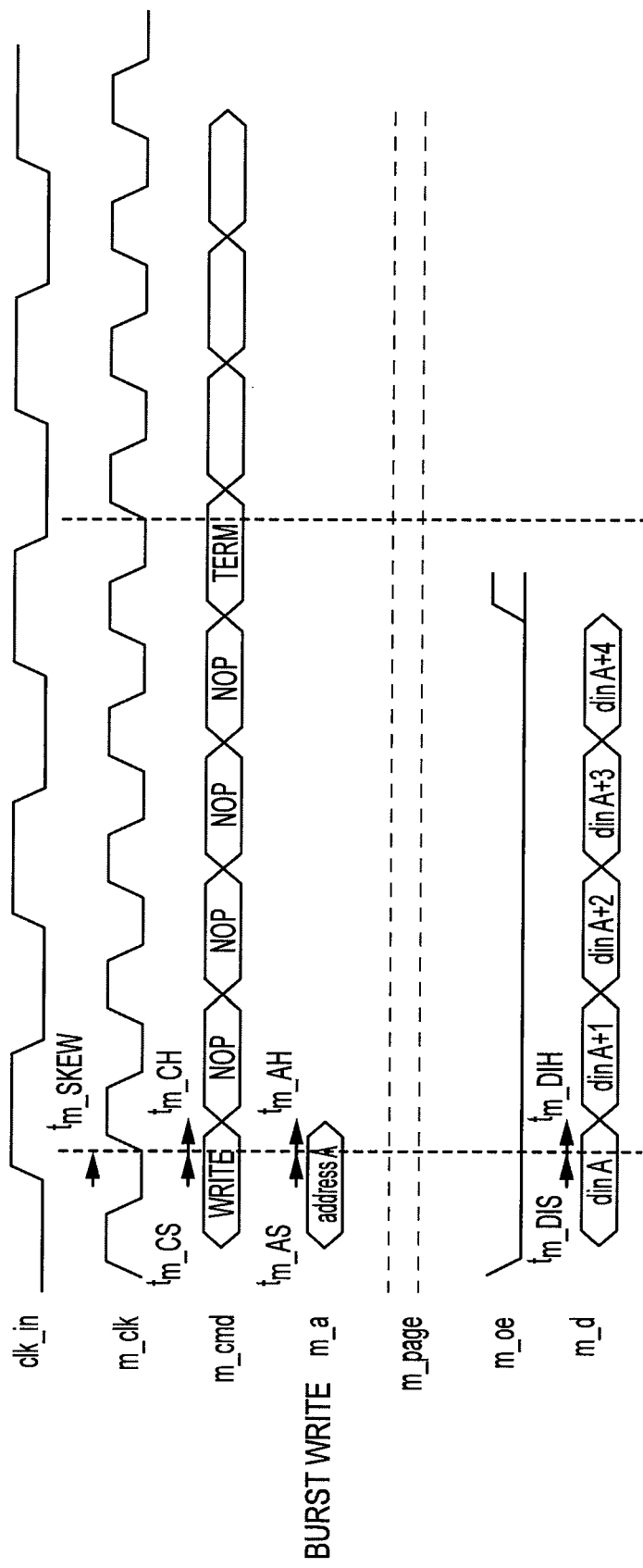
Figure 13:
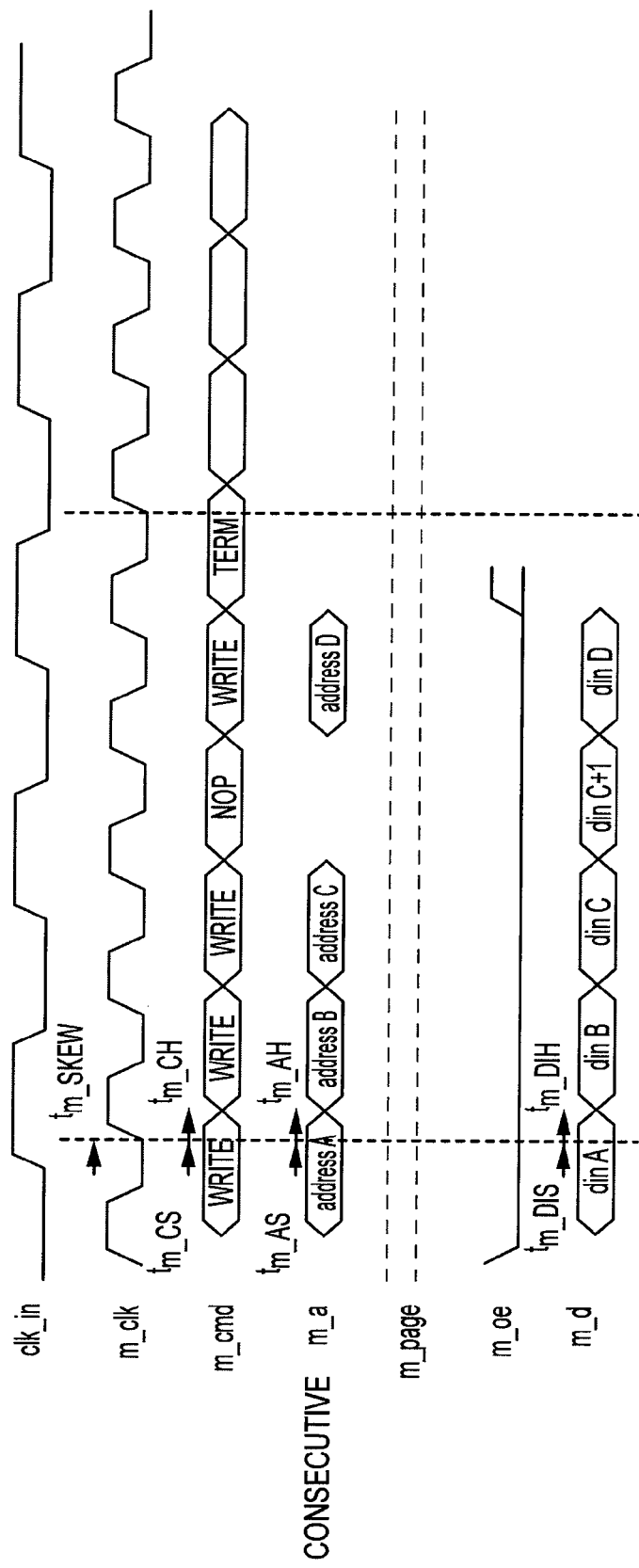

FIG. 12 is a timing diagram illustrating the operation of a single burst WRITE command and FIG. 13 is a timing diagram illustrating the operation of the consecutive WRITE commands, illustrating the termination of prior WRITE bursts by subsequent WRITE commands.

Figure 14:
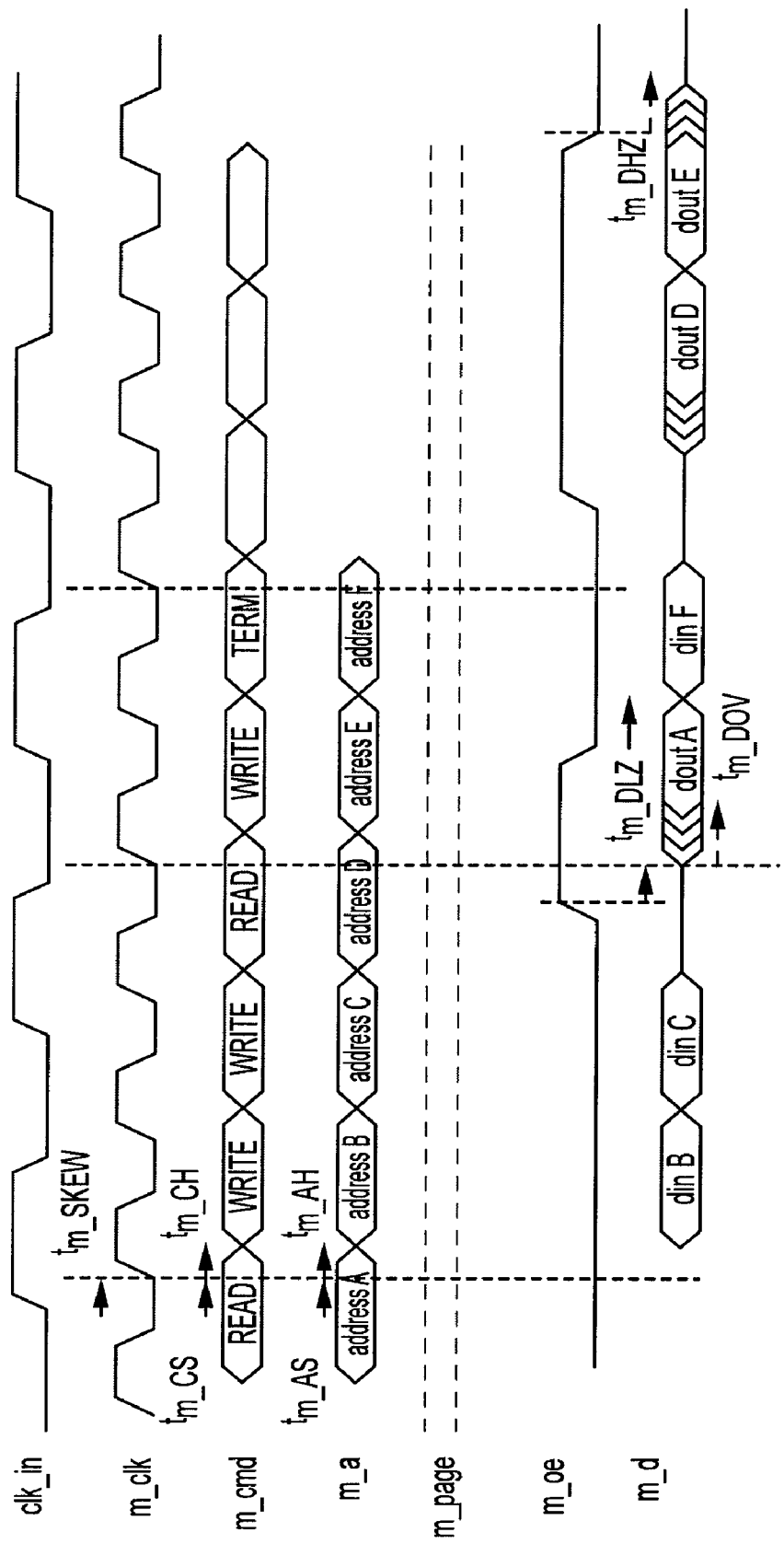
Figure 15:
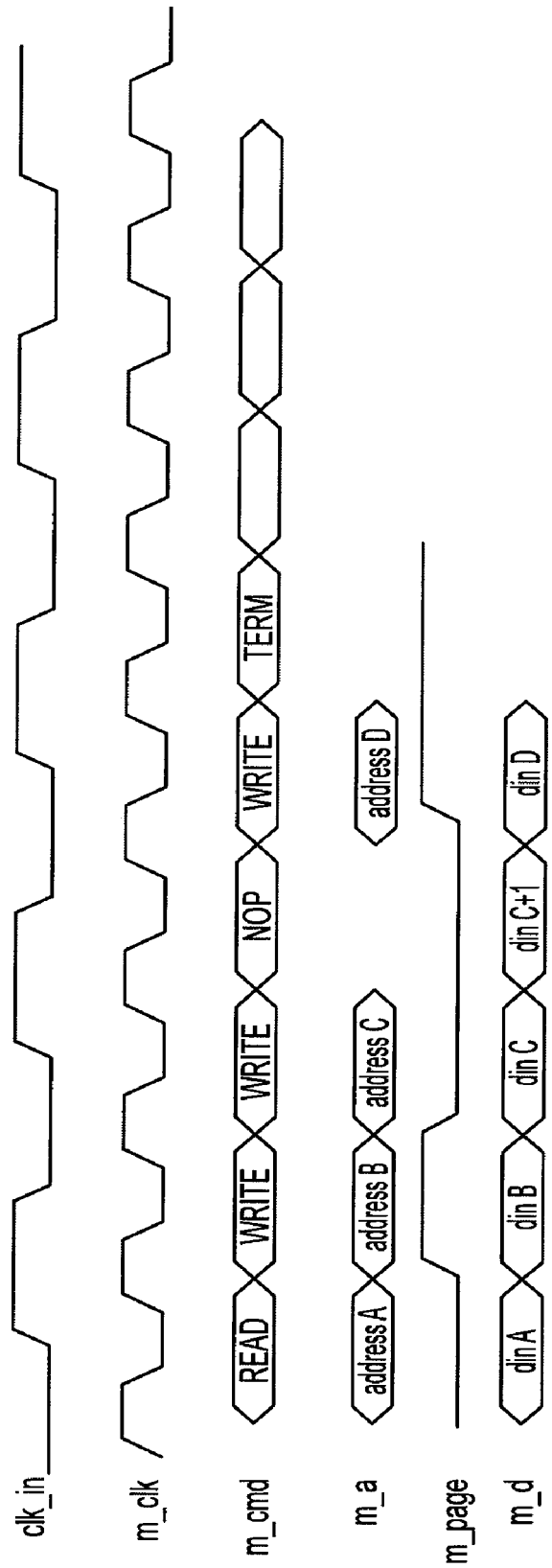

READ and WRITE commands may be interleaved as illustrated in the timing diagram of FIG. 14. NOP commands may be inserted between consecutive READ commands or WRITE commands or interleaved READ and WRITE commands as illustrated in the timing diagram of FIG. 15, where a single NOP is inserted between the third and fourth WRITE commands to obtain a WRITE burst of 2 32-bit words. In FIG. 15, consecutive WRITE commands are shown addresses to alternate pages by toggling of the m_page signal. A burst to one page is terminated by any command to the other page.

A burst terminate command 764 (see Table 2) may be issued by the host 102 to terminate a data read or write burst and return the FSM 306 to the active state 704.

From the active, read or write states 702, 704 or 706, upon receipt of the DEACTIVATE or PRECHARGE command 752 (see Table 2), a page in the H-registers 402 is deactivated and its contents are returned to the memory 106 at the row corresponding to the row address part of the memory address 210 via the DRAM registers 404. The ACTIVE command can take a variable amount of time. Again, the READY signal is used to signal to the host that the DEACTIVATE or PRECHARGE command has completed. Thus, after a DEACTIVATE or PRECHARGE command 752 has been issued by the host 102, the command inputs will be ignored until after a READY signal 222 is asserted indicating completion of the DEACTIVATE or PRECHARGE command 752. If a page is activated by issuance of an ACTIVE command 754 and then no WRITE command 758 is issued, since no data has been written into the PE array 110 by the memory interface 112, the DEACTIVATE or PRECHARGE command 752 terminates immediately taking no action and asserting the READY signal 222.

Figure 9:
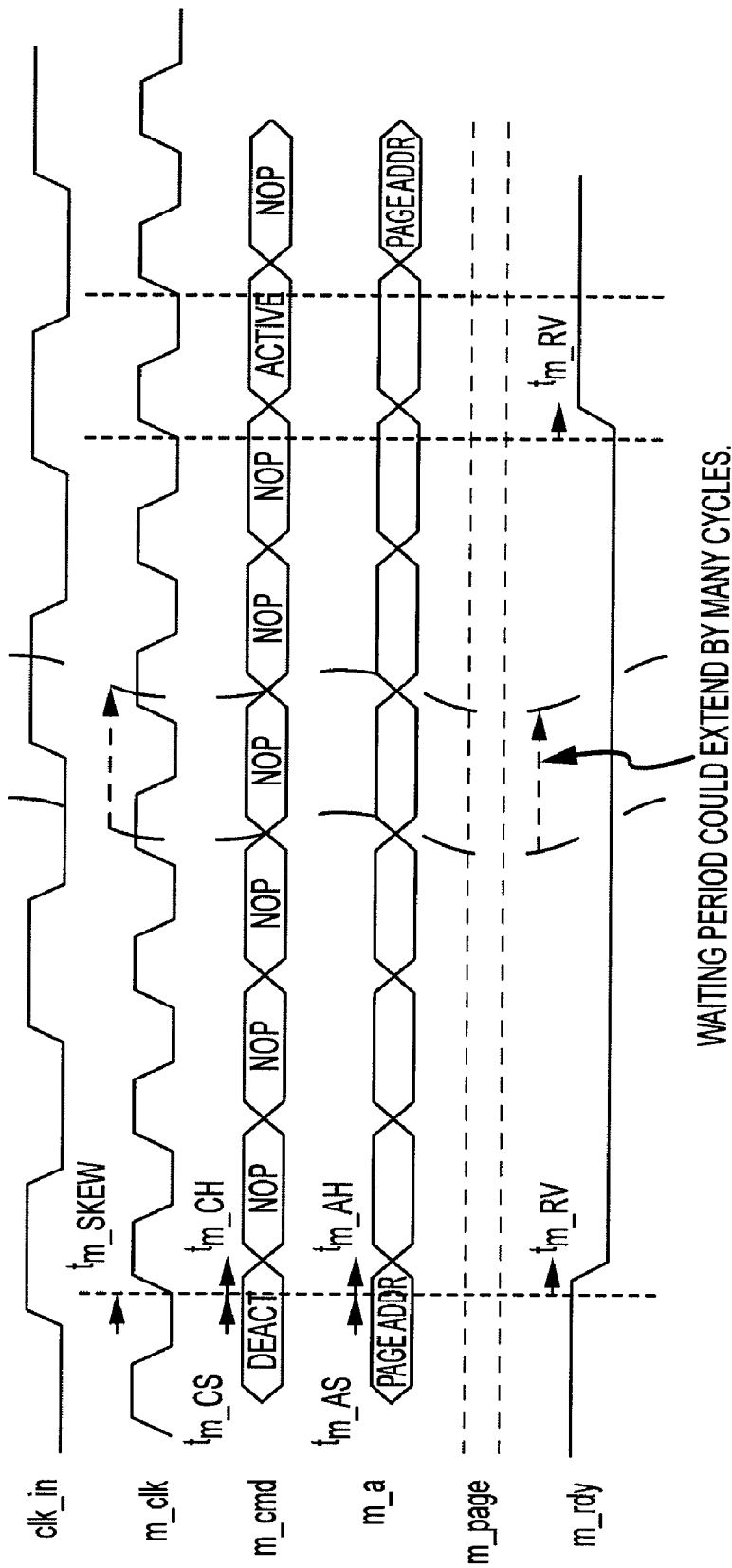

FIG. 9 is a timing diagram illustrating the operation of the DEACTIVATE command.

The NOP command 760 see Table 2 is used to prevent unwanted commands from being registered during the idle, active, read or write states. Operations that are already in progress are not affected by issuance of the NOP command 760 by the host 102.

The LOAD command 762 (see Table 2) is a single-cycle command that can be issued at any time, except during activation and deactivation. Issuance of a LOAD command 762 by the host 102 will immediately terminate any read or write burst that is currently taking place. The LOAD command 762 causes the mode fields placed into the memory address lines by the host 101 to be loaded into the mode register 304.

It will of course be understood that the present invention has been described above purely by way of example and modifications of detail can be made within the scope of the invention.

The invention claimed is:

1. An integrated circuit active memory comprising:
   a memory interface coupled to receive externally generated commands and addresses through an external port, the memory interface further being operable to transmit data to and from the external port, the memory interface being operable to output memory control signals and processor control signals responsive to the externally generated commands, and to output processing element array addresses and memory device addresses responsive to the externally generated addresses;
   an array of processing elements coupled to the memory interface, each processing element in the array being operable to process varying widths of data, the processing elements in the array being selected by the processing element array addresses, the selected set of processing elements being further operable to receive data from the memory interface and to receive data from the memory interface responsive to the processor control signals, the selected set of processing elements further being operable to transmit the data to the memory interface responsive to the processor control signals; and
   a memory device coupled to the memory interface and to the array of processing elements, the memory device being operable responsive to the memory control signals to receive data from processing elements, and to store the data received from the processing elements at a location in the memory device selected by the memory device addresses, the memory device further being operable responsive to the memory control signals to receive data stored in the memory device at a location selected by the memory device addresses and to transmit the data stored in the memory device to the processing elements.

2. The integrated circuit active memory device of claim 1 wherein the externally generated addresses comprise row and column addresses.

3. The integrated circuit active memory device of claim 1 wherein the memory device comprises a dynamic random access memory device.

4. The integrated circuit active memory device of claim 1 wherein the memory interface comprises:
   a control logic unit coupled to the external port to receive externally generated commands and addresses, the control logic unit being coupled to the memory device to apply the memory control signals and memory device addresses to the memory device responsive to the externally generated commands and addresses, the control logic unit further being coupled to the array of processing elements to apply the processor control signals and the processing element array addresses to the set of processing elements responsive to the externally generated commands and addresses; and
   a data register coupled to the external port and the array of processing elements, the data register being operable to receive data from the external port and to couple the received data from the external port to the array of processing elements, the data register further being operable to receive data from the array of processing elements and to couple the data received from the array of processing elements to the external port.

5. The integrated circuit active memory device of claim 4 wherein the control logic unit comprises:
   a state machine coupled to the external port, the array of processing elements and the memory device, the state machine being operable to generate the processor control signals applied to the array of processing elements and the memory device control signals applied to the memory device responsive to the externally generated commands;

an address register coupled to receive the externally generated addresses from the external port and couple the memory addresses to an address output port, the address output port being coupled to the memory device to provide the memory device addresses to the memory device; and an address transform logic unit coupled to the address output port of the address register and to the array of processing elements, the address transform logic being operable to transform the addresses received from the address register and to apply the transformed addresses to the array of processing elements as the processing element array addresses.

6. The integrated circuit active memory device of claim 5, further comprising a mode register coupled to the external port and to the address transform logic unit, the mode register being operable to store mode signals and to couple the stored mode signals to the address transform logic, and wherein the address transform logic unit is operable to vary the manner in which the addresses received from the address register are transformed responsive to mode signals received from the mode register.

7. A computer system, comprising:
a host processor;
a host/memory interface coupled to the host processor to receive memory commands from the host processor, to receive memory addresses from the host processor, and to receive data from and transmit data to the host processor;
an array of processing elements coupled to the host/memory interface, each processing element being structured to process varying widths of data, the processing elements in the array being selected by at least a portion of the memory addresses received by the host/memory interface, the selected processing elements being operable to receive data of varying widths from and transmit data of varying widths to the host/memory interface; and
a memory device coupled to the host/memory interface and to the array of processing elements, the memory device being operable responsive to the memory commands to store data received from the at least one of the processing elements at a location selected by at least a portion of the memory addresses received by the host/memory interface, the memory device further being operable responsive to the memory commands to receive data stored in the memory device at a location selected by at least a portion of the memory addresses received by the host/memory interface and to transmit the data stored in the memory device to at least one of the processing elements.

8. The computer system of claim 7, further comprising a memory control unit coupled to the host/memory interface and to the memory device, the memory control unit being operable to generate memory control signals responsive to the memory commands.

9. The computer system of claim 7 wherein the memory device comprises a dynamic random access memory device.

10. The computer system of claim 7 wherein the host/memory interface comprises:
a control logic unit coupled to the host processor to receive the memory commands and addresses, the control logic unit being coupled to the memory device to apply memory device control signals and memory device addresses to the memory device responsive to the memory commands and memory addresses, respectively, received from the host processor, the control logic unit further being coupled to the array of processing elements to apply processing element array control signals and processing element array addresses to the array of processing elements responsive to memory commands and memory addresses, respectively, received from the host processor; and a data register coupled to the host processor and the array of processing elements, the data register being operable to receive write data from the host processor and to couple the write data to the array of processing elements, the data register further being operable to receive read data from the array of processing elements and to couple the read data to the host processor.

11. The computer system of claim 10 wherein the control logic unit comprises:
a state machine coupled to the host processor, the array of processing elements and the memory device, the state machine being operable to generate the processing element control signals applied to the array of processing elements and the memory device control signals applied to the memory device responsive to the memory commands;

an address register coupled to receive the memory addresses from the host processor and couple the memory addresses to an address output port, the address output port being coupled to the memory device to provide the memory device addresses to the memory device; and an address transform logic unit coupled to the address output port of the address register and to the array of processing elements, the address transform logic unit being operable to transform the addresses received from the address register and to apply the transformed addresses to the array of processing elements as the processing element array addresses.

12. The computer system of claim 11, further comprising a mode register coupled to the host processor and to the address transform logic unit, the mode register being operable to store mode signals and to couple the stored mode signals to the address transform logic, and wherein the address transform logic unit is operable to vary the manner in which the addresses received from the address register are transformed responsive to the mode signals received from the mode register.

13. A method of reading data from an active memory including a memory device and an array of processing elements connected to the memory device, comprising:
determining for data having a range of varying data widths a width of the data to process;
transferring data having the determined width from the memory device to the array of processing elements; and
reading data having the determined width from at least one of the processing elements and outputting the read data from the active memory.

14. The method of claim 13, further comprising transferring data having the determined width from the array of processing elements to the memory device at a location corresponding to an address.

15. A method of writing data to an active memory including a memory device and an array of processing elements connected to the memory device, comprising:
determining for data having a range of varying data widths a width of the data to process;

transferring data having the determined width from at least one of the processing elements to the memory device; and inputting data to the active memory and writing the data to at least one of the processing elements.

16. The method of claim 15, further comprising transferring data having the determined width from the array of processing elements to the memory device corresponding to an address.

17. An integrated circuit active memory comprising:

a memory interface coupled to receive externally generated commands and addresses from an external port, the memory interface further being operable to transmit data to and from the external port, the memory interface being operable to select a processing element operation and to output memory control signals and processor control signals responsive to the externally generated commands, and to output processing element array addresses and memory device addresses responsive to the externally generated addresses;

an array of processing elements coupled to the memory interface, the processing elements being further operable to receive data from the memory interface responsive to the processor control signals, the processing elements further being operable to transmit data to the memory interface responsive to the processor control signals;

a memory device coupled to the memory interface and to the array of processing elements, the memory device being operable responsive to the memory control signals to receive data from at least one of the processing elements, and to store the data received from the at least one of the processing elements at a location in the memory device selected by the memory device addresses, the memory device further being operable responsive to the memory control signals to receive data stored in the memory device at a location selected by the memory device addresses and to transmit the data stored in the memory device to at least one of the processing elements; and a control logic unit included in the memory interface, the control logic unit being coupled to the external port to receive externally generated commands and addresses, the control logic unit being coupled to the memory device to apply the memory control signals and memory device addresses to the memory device responsive to the externally generated commands and addresses, the control logic unit further being coupled to the array of processing elements to apply the processor control signals and the processing element array addresses to the set of processing elements responsive to the externally generated commands and addresses, the control logic unit comprising an address transform logic unit coupled to the memory interface and to the array of processing elements, the address transform logic being operable to transform addresses received from the memory interface and to apply the transformed addresses to the array of processing elements as the processing element array addresses.

18. The integrated circuit active memory device of claim 17 wherein the control logic unit further comprises:

a state machine coupled to the external port, the array of processing elements and the memory device, the state machine being operable to generate the processor control signals applied to the array of processing elements and the memory device control signals applied to the memory device responsive to the externally generated commands; and an address register coupled to receive the externally generated addresses from the external port and couple the memory addresses to an address output port, the address output port being coupled to the memory device to provide the memory device addresses to the memory device.

19. The integrated circuit active memory device of claim 17 wherein the control logic unit further comprises a data register included in the memory interface, the data register being coupled to the external port and the array of processing elements, the data register being operable to receive data from the external port and to couple the received data from the external port to the array of processing elements, the data register further being operable to receive data from the array processing elements and to couple the data received from the array of processing elements to the external port.

20. The integrated circuit active memory device of claim 17 wherein the externally generated addresses comprise row and column addresses.

21. The integrated circuit active memory device of claim 17 wherein the memory device comprises a dynamic random access memory device.

22. The integrated circuit active memory device of claim 17 wherein the externally generated commands include mode signals and further comprising a mode register coupled to the external port and to the address transform logic unit, the mode register being operable to store mode signals and to couple the stored mode signals to the address transform logic, and wherein the address transform logic unit is operable to vary the manner in which the addresses received from the address register are transformed responsive to the mode signals received from the mode register.

23. A computer system, comprising:

a host processor;

a host/memory interface coupled to the host processor to receive memory commands from the host processor, to receive memory addresses from the host processor, and to receive data from and transmit data to the host processor, the host/memory interface being further configured to select a processing element mode of operation responsive to the memory commands from the host processor;

an array of processing elements coupled to the host/memory interface, the processing elements in the array being selected by at least a portion of the memory addresses received by the host/memory interface, the selected processing elements being operable responsive to the memory commands to receive data from and transmit data to the host/memory interface;

a memory device coupled to the host/memory interface and to the array of processing elements, the memory device being operable responsive to the memory commands to store data received from at least one of the processing elements at a location selected by at least a portion of the memory addresses received by the host/memory interface, the memory device further being operable responsive to the memory commands to receive data stored in the memory device at a location selected by at least a portion of the memory addresses received by the host/memory interface and to transmit the data stored in the memory device to at least one of the processing elements; and a control logic unit included in the host/memory interface, the control logic unit being coupled to the host processor to receive the memory commands and addresses, the control logic unit being coupled to the memory device to apply memory device control signals and memory device addresses to the memory device responsive to the memory commands and memory addresses, respectively, received from the host processor, the control logic unit further being coupled to the array of processing elements to apply processing element array control signals and processing element array addresses to the array of processing elements responsive to memory commands and memory addresses, respectively, received from the host processor, the control logic unit comprising an address transform logic unit coupled to the host/memory interface and to the array of processing elements, the address transform logic unit being operable to transform the addresses received from the host/memory interface and to apply the transformed addresses to the array of processing elements as the processing element array addresses.

24. The computer system of claim 23 wherein the control logic unit further comprises:
a state machine coupled to the host processor, the array of processing elements and the memory device, the state machine being operable to generate the processing element control signals applied to the array of processing elements and the memory device control signals applied to the memory device responsive to the memory commands; and
an address register coupled to receive the memory addresses from the host processor and couple the memory addresses to an address output port, the address output port being coupled to the memory device to provide the memory device addresses to the memory device.

25. The computer system of claim 23 wherein the control logic unit further comprises a data register included in the host/memory interface, the data register being coupled to the host processor and the array of processing elements, the data register being operable to receive write data from the host processor and to couple the write data to the array of processing elements, the data register further being operable to receive read data from the array of processing elements and to couple the read data to the host processor.

26. The computer system of claim 23, further comprising a memory control unit coupled to the host/memory interface and to the memory device, the memory control unit being operable to generate memory control signals responsive to the memory commands.

27. The computer system of claim 23 wherein the memory device comprises a dynamic random access memory device.

28. The computer system of claim 23 wherein the memory commands include mode signals, and wherein the computer system further comprises a mode register coupled to the host processor and to the address transform logic unit, the mode register being operable to store mode signals and to couple the stored mode signals to the address transform logic, and wherein the address transform logic unit is operable to vary the manner in which the addresses received from the address register are transformed responsive to the mode signals received from the mode register.

29. A method of transferring data between a host processor and an active memory including a memory device and an array of processing elements connected to the memory device, comprising:
transferring commands from the host processor to the active memory, at least some of the commands including an address;
generating memory control signals and processor control signals responsive to the commands;
generating memory device addresses and processing element array addresses responsive to the addresses included in the commands;
selectively altering a correspondency between the processing element array addresses and the addresses included in the commands;
transferring data identified by one of the memory device addresses from the memory device to at least one of the processing elements;
causing the at least one of the processing elements to operate on the transferred data;
outputting read data to the host processor responsive to the control signals from at least one of the processing elements corresponding to the processing element array address;
writing write data from the host processor responsive to the control signals to at least one of the plurality of processing elements corresponding to the processing element array address; and
transferring data from one of the plurality of processing elements to one of the memory devices and a location corresponding to one of the generated memory device addresses.

30. A method of transferring data between a host processor and an active memory including a memory device and an array of processing elements connected to the memory device, comprising:
transferring commands from the host processor to the active memory, at least some of the commands including an address;
generating memory control signals and processor control signals responsive to the commands;
generating memory device addresses and processing element array addresses responsive to the addresses included in the commands;
selectively altering a correspondency between the memory device addresses and the addresses included in the commands;
transferring data identified by one of the memory device addresses from the memory device to at least one of the processing elements;
causing the at least one of the processing elements to operate on the transferred data;
outputting read data to the host processor responsive to the control signals from at least one of the processing elements corresponding to the processing element array address;
writing write data from the host processor responsive to the control signals to at least one of the plurality of processing elements corresponding to the processing element array address; and
transferring data from one of the plurality of processing elements to one of the memory devices and a location corresponding to one of the generated memory device addresses.

31. The method of claim 30 wherein the act of applying commands and addresses to the active memory device comprises applying row and column addresses to the active memory device.

32. A method of transferring data to and from an active memory comprising:
applying commands and addresses to the active memory device;
applying data to or receiving data from the active memory device;

generating memory control signals and processor control signals responsive to the commands;

generating memory device addresses responsive to the addresses applied to the active memory device;

generating processing element array addresses responsive to the addresses applied to the active memory device by selectively altering a correspondency between the processing element array addresses and the addresses applied to the active memory device;

transferring write data to or read data from a memory device responsive to the memory control signals at a location corresponding to the generated memory device addresses;

selecting a subset of processing elements in an array responsive to the generated processing element array addresses;

transferring the read data from the memory device to the selected subset of processing elements responsive to the generated memory control signals and processor control signals; and transferring the write data from the selected subset of processing elements to the memory device responsive to the generated memory control signals and processor control signals.

33. The method of claim 32 wherein the act of applying commands and addresses to the active memory device comprises applying dynamic random access memory commands to the active memory device.

34. A method of transferring data to and from an active memory comprising:

applying commands and addresses to the active memory device;

applying data to or receiving data from the active memory device;

generating memory control signals and processor control signals responsive to the commands;

generating processing element array addresses responsive to the addresses applied to the active memory device;

generating memory device addresses responsive to the addresses applied to the active memory device by selectively altering a correspondency between the memory device addresses and the addresses applied to the active memory device;

transferring write data to or read data from a memory device responsive to the memory control signals at a location corresponding to the generated memory device addresses;

selecting a subset of processing elements in an array responsive to the generated processing element array addresses;

transferring the read data from the memory device to the selected subset of processing elements responsive to the generated memory control signals and processor control signals; and transferring the write data from the selected subset of processing elements to the memory device responsive to the generated memory control signals and processor control signals.

35. The method of claim 34 wherein the act of applying commands and addresses to the active memory device comprises applying dynamic random access memory commands to the active memory device.

36. The method of claim 34 wherein the act of applying commands and addresses to the active memory device comprises applying row and column addresses to the active memory device.

* * * * *

UNITED STATES PATENT AND TRADEMARK OFFICE
CERTIFICATE OF CORRECTION

| | | |
|---|---|---|
| PATENT NO. | : 7,849,276 B2 | |
| APPLICATION NO. | : 12/205673 | |
| DATED | : December 7, 2010 | |
| INVENTOR(S) | : Graham Kirsch et al. | |

It is certified that error appears in the above-identified patent and that said Letters Patent is hereby corrected as shown below:

Title Pg, Item (30), under "Foreign Application Priority Data", in column 1, line 2, delete "02228438.8" and insert -- 0228438.8 --, therefor.

Signed and Sealed this
Twenty-second Day of February, 2011

David J. Kappos
*Director of the United States Patent and Trademark Office*